(12) United States Patent
Förster et al.

(10) Patent No.: US 6,215,213 B1
(45) Date of Patent: Apr. 10, 2001

(54) DRIVE ARRANGEMENT FOR A MOTOR VEHICLE

(75) Inventors: Bernd Förster; Ernst Bartels, both of Dittelbrunn; Dieter Bauch-Panetzky, Schweinfurt; Cora Carlson, Dittelbrunn; Martin Ochs, Walldorf; Alfred Tareilus, Schweinfurt; Reinhold Weidinger, Unterspiesheim; Jürgen Weimer, Euerbach, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/330,868

(22) Filed: Jun. 11, 1999

(30) Foreign Application Priority Data

Jun. 12, 1998 (DE) .............................. 198 26 146

(51) Int. Cl.⁷ ............................ H02K 7/02; H02K 7/108; F16F 15/18
(52) U.S. Cl. ........................ 310/78; 310/75 R; 310/68 B; 310/92; 310/96; 310/51; 74/574
(58) Field of Search ..................... 310/75 R, 74, 310/78, 76, 80, 92, 96, 97, 98, 100, 68 B, 156, 51; 74/574, 573 R; 324/207.25

(56) References Cited

U.S. PATENT DOCUMENTS

| | | | |
|---|---|---|---|
| 4,687,952 | * | 8/1987 | Capizzi ............................ 324/207.25 |
| 5,097,209 | * | 3/1992 | Santos ............................. 324/207.25 |
| 5,536,208 | * | 7/1996 | Krumm ................................. 464/68 |
| 5,675,250 | * | 10/1997 | Berglund et al. ................ 324/207.25 |
| 5,691,588 | * | 11/1997 | Lutz et al. ............................. 310/92 |
| 5,757,180 | * | 5/1998 | Chou et al. ..................... 324/207.24 |
| 5,836,216 | | 11/1998 | Sudau et al. . |
| 5,921,149 | * | 7/1999 | Masberg et al. ........................ 74/574 |
| 5,927,452 | * | 7/1999 | Freise et al. ............................ 310/74 |

FOREIGN PATENT DOCUMENTS

| | | | |
|---|---|---|---|
| 43 23 601 A1 | 1/1995 | (DE) | ................. B60K/6/04 |
| 196 09 043 C1 | 7/1997 | (DE) | ............. F16F/15/134 |
| 196 31 384 | 10/1997 | (DE) | ................. H02K/7/00 |
| 0 175 952 | 4/1986 | (EP) | ................. G05D/13/62 |
| 1 233 748 | 5/1971 | (GB) | ................. H02K/7/18 |
| 2 023 352 | 12/1979 | (GB) | ................. H02K/7/00 |
| 4-95644 | 8/1990 | (JP) | ................. F16H/9/18 |
| 9-79119 | 9/1995 | (JP) | ................. F02N/11/04 |
| 97/08435 | 3/1997 | (WO) | ................. F02B/75/06 |
| 98/05882 | 2/1998 | (WO) | ................. F16F/15/18 |

* cited by examiner

*Primary Examiner*—Burton Mullins
(74) *Attorney, Agent, or Firm*—Cohen, Pontani, Lieberman & Pavane

(57) ABSTRACT

A drive arrangement for a motor vehicle includes an internal combustion engine with a crankshaft which is selectively connectable to an output drive shaft via an interposed clutch system. The clutch system has at least two flywheel masses which are rotatable relative to each other. A first flywheel mass comprises at least one primary flange which is permanently connected to the crankshaft. The clutch system also includes an electric machine which has a rotor with a rotor carrier, the electric machine being arranged in the clutch system so that the primary flange is part of the rotor carrier.

3 Claims, 3 Drawing Sheets

DRIVE ARRANGEMENT FOR A MOTOR VEHICLE

BACKGROUND OF THE INVENTION

1. Field of the Invention

The present invention relates to a drive arrangement for a motor vehicle connectable to a crankshaft of an internal combustion engine and having a clutch system which includes an electric machine for damping torsional vibrations.

2. Description of the Related Art

A prior art clutch system with a flywheel mass is disclosed, for example, by German reference DE 196 09 043 C1. This flywheel mass device includes a first flywheel mass and a second flywheel mass. A primary flange which is permanently connected to a crankshaft of an internal combustion engine is part of the first flywheel mass which can be rotated relative to the second flywheel mass. These two flywheel masses form the flywheel disk of a friction clutch which is connected downstream from the flywheel masses. The second flywheel mass, also referred to as the secondary flywheel mass, can be connected to an output drive shaft via the friction clutch. The disadvantage with this type of prior art clutch system is that the damping capacity of the flywheel mass device is frequency-dependent. In particular, the damping capacity is limited at a maximum to predeterminable frequency ranges.

A prior art drive arrangement for hybrid vehicles is disclosed in German reference DE 43 23 601 A1 and comprises an internal combustion engine which can be coupled to an output drive shaft via an interposed clutch. This drive arrangement also includes an electric machine comprising a rotor designed as an external rotor which is connected to the output drive shaft. A friction clutch is arranged radially inside of the electric machine. When the clutch is disengaged, the electric machine does not influence the rotational behavior of the crankshaft. Rotational nonuniformities in the crankshaft may cause a tumbling movement of the crankshaft. The tumbling movement may severely load the bearings of the crankshaft and of the internal combustion engine and may cause nonuniform wear of the friction clutch, particularly the friction linings, during a clutch reengagement operation.

Because of the recent developments relating to ever more economical drive systems in relation to fuel consumption, internal combustion engines are becoming less and less uniform in terms of their rotational behavior. Such rotational nonuniformities may lead to severe loading of components in the drive train as mentioned above may result in premature material fatigue.

SUMMARY OF THE INVENTION

It is an object of the present invention to provide a powerful system for damping rotational nonuniformities in a drive train of a motor vehicle.

It is a further object of the present invention to provide a compact system for the damping of rotational nonuniformities in a drive train of a motor vehicle.

The object of the invention is achieved by a drive arrangement for a motor vehicle, comprising a crankshaft of an internal combustion engine and a clutch system for selectively connecting the crankshaft to an output drive shaft, the clutch system having first and second flywheel masses, the first flywheel mass being rotatable relative to the second flywheel mass and having a primary flange fixedly connected to the crankshaft, the clutch system further comprising an electric machine activatable for producing a torque counter to rotational nonuniformities occurring in the crankshaft and having a stationary portion comprising a stator and a rotor mounted on a rotor carrier, the primary flange of the first flywheel mass comprising a portion of the rotor carrier.

The drive arrangement of the present invention has an internal combustion engine with a crankshaft which can be connected to an output drive shaft via an interposed clutch system. The clutch system has at least two flywheel masses which are coupled to each other and, with the clutch engaged, can be rotated relative to each other. The first flywheel mass comprises at least one primary flange which is permanently connected to the crankshaft. This primary flange is part of a rotor carrier of an electric machine arranged in the drive train. This electric machine is permanently connected to the internal combustion engine so that even when the clutch is disengaged, the electric machine can introduce torques which are directed counter to the rotational nonuniformities generated by the internal combustion engine. Any torque nonuniformities which occur can be damped by this system by using either or both of the electric machine and flywheel masses which can be rotated in relation to each other even with the clutch disengaged. By activating the electric machine, a torque directed counter to the rotational nonuniformities is provided over a large frequency range. By tuning a two-mass flywheel formed by the flywheel masses to a frequency range in which large rotational nonuniformities occur, it is possible to relieve the load on the electric machine. Some of the rotational nonuniformities introduced by the internal combustion engine can be damped by the electric machine, and any remaining part can be damped by the mutually rotatable masses. Provision may also be made, in selected frequency ranges, to damp the torque nonuniformities introduced by the internal combustion engine solely by the mutually rotatable masses.

The incorporation of the primary flange as part of the rotor carrier carrying the rotor reduces the number of components and thereby produces a savings in costs, and reduces the required installation space occupied by this system.

In a preferred embodiment, the rotor includes a position transmitter for detecting the relative position of the rotor in relation to a fixed component which is preferably a stator of the electric machine.

A moving element of the position transmitter is permanently connected to the rotor carrier. The movement of the moving element is picked up by a detecting sensor system which is arranged for detecting movement of the moving element. The moving element of the position transmitter may be connected to the rotor carrier or to the primary flange using a recess and stud connection, a press fit or a welding connection.

In a further embodiment, the position transmitter generates at least two distinguishable output signals. The first output signal characterizes the relative position of rotor and stator and the second output signal characterizes the relative position of the crankshaft. The first output signal is preferably used for activating the electric machine, and the second output signal is preferably used to coordinate the activation of the electric machine with the ignition sequence of the internal combustion engine.

In yet a further embodiment, a cover plate is permanently fixed to the primary flange to form an axial edge. The cover plate includes a profile connected to a radial outer bounding edge of the cover plate. Movement of the profile is picked up by an associated sensor system when an assembly including the cover plate, primary flange and rotor is rotated. The profile may comprise segments which, together with the sensor system, form an incremental encoder. The profile preferably has a significant point along the circumference of the cover plate so that the angular position of the crankshaft is defined uniquely by the profile. Since the cover plate, primary flange and rotor are connected to the crankshaft, the significant point of the cover plate may be used to detect a crankshaft position. The detected crankshaft position may be used, for example, for activating the internal combustion engine. In this design of the sensor system, it is advantageous that the profile is formed in or on a cover plate which is provided to form an axial edge for the clutch arrangement. Thus, no separate component is needed for position detection, which has an advantageous effect on the production costs. This arrangement, comprising cover plate and associated sensor system, may also be provided in a drive arrangement having a clutch system without an electric motor.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
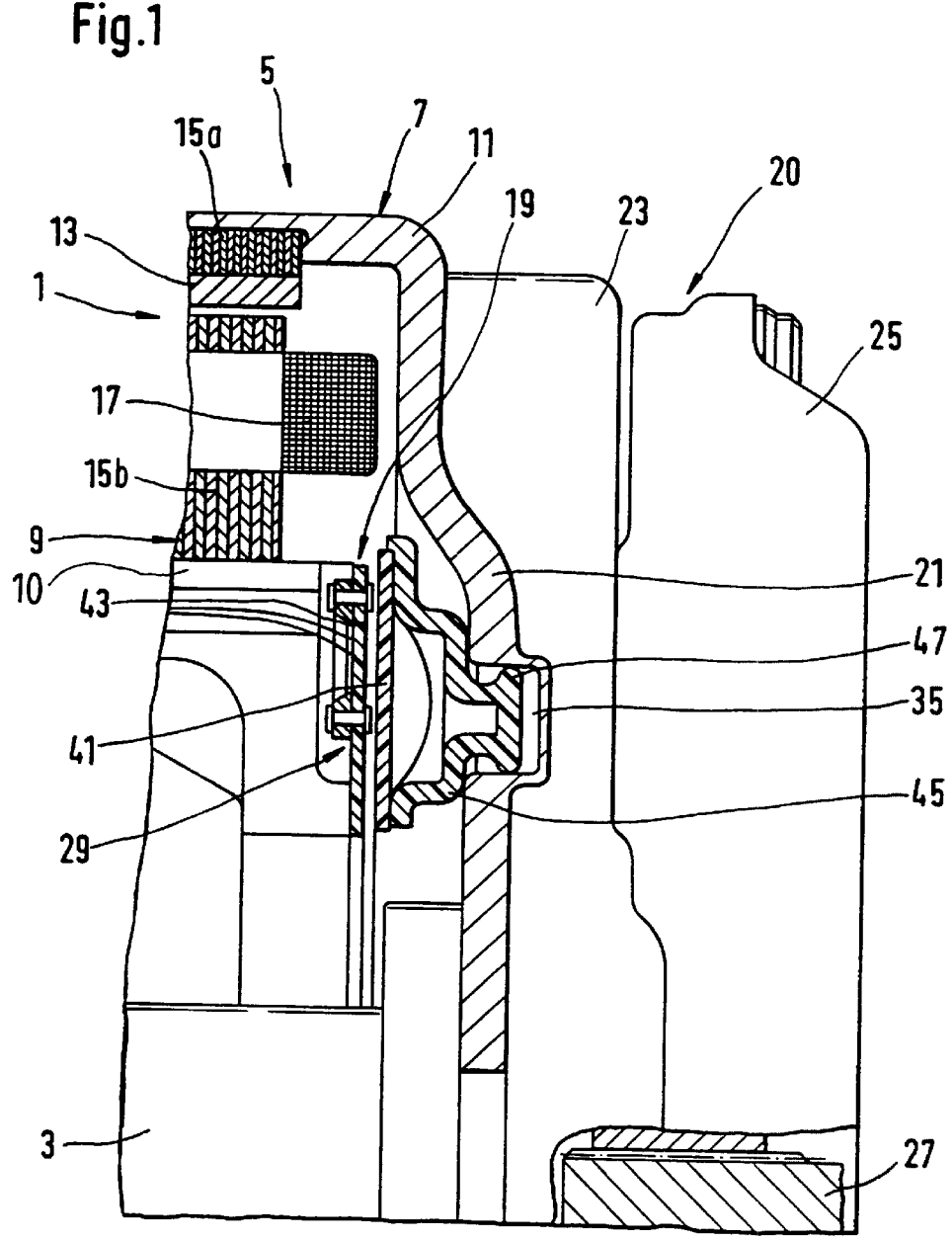
FIG. 1 shows a drive arrangement according to an embodiment of the present invention.

The basic construction of a drive arrangement 1 according to an embodiment of the present invention will be described with reference to FIG. 1. The drive arrangement 1 comprises an internal combustion engine (not illustrated) having a crankshaft 3. A rotor carrier 11 for a rotor 7 of an electric machine 5 is permanently connected to the crankshaft 3. The rotor carrier 11 comprises a radially outer region coaxially arranged with the crankshaft 3. This radially outer region bears a stack of laminations 15a fitted with radially inwardly pointing permanent magnets 13. These permanent magnets 13 coaxially surround a stator 9 having a stator carrier 10 which is arranged radially on the inside of the rotor 7 and mounted in a fixed position between the crankshaft 3 and the rotor 7. The stator 9 comprises a stack of laminations 15b mounted on the stator carrier 10 and fitted with stator coils 17. A position transmitter 19 comprising sensor system 43 is mounted on the stator carrier 10 for sensing any movement of the rotor 7 relative to the stator 9. A moving element 41 which is detectable by the sensor system 43 of position transmitter 19 is permanently connected to the rotor carrier 11 of the rotor 7 by a holder 45. Recesses 35 are arranged circumferentially in the rotor carrier 11 and reach axially through the rotor carrier 11. Studs 47 which are formed in one piece with the holder 45 engage these recesses 35 to connect the holder 45 to the rotor carrier 11. The open end of the recesses 35 in the rotor carrier 11 are completely closed by the studs 47 to form a space in the recess 35 which axially adjoins the studs 47. In a preferred embodiment, the studs 47 are made of a plastic material. The electric machine 5 which is formed by the rotor 7 and stator 9 is connected to a clutch system 20 which has a two-mass flywheel 23 (shown schematically) and a friction clutch 25. The two-mass flywheel 23 comprises a primary flange 21 which is part of the rotor carrier 11. The primary flange 21 forms a primary mass of the two-mass flywheel 23 and is permanently connected to the crankshaft 3. Since the primary flange 21 comprises the moving element 41 of the position transmitter 19, the position transmitter detects the relative position of the crankshaft 3. In addition, the position transmitter 19 simultaneously detects the position of the rotor 7 relative to the stator 9. Referring to FIG. 1a, the position transmitter 19 outputs a first signal 61 characterizing a relative position of the rotor 7 and stator 9 which may be used for activating the electric machine 5 and a second signal 63 characterizing a relative position of the crankshaft 3 which may be used to coordinate the activation of the electric machine 5 with the ignition sequence of the internal combustion engine.

Clutch systems having two-mass flywheels are already known, for example, from German reference DE 196 09 043 C1. For this reason, an extensive description of the two-man flywheel 23 is omitted here.

A second flywheel mass 22 (shown partially in FIG. 2) of the two-mass flywheel 23 is arranged on the output drive side and is permanently connected to an adjacent friction clutch 25. This second flywheel mass 22 is firmly connectable to an output drive shaft 27 via the friction clutch 25. The output drive shaft 27 may comprise a gearbox input shaft of a gearbox (not illustrated).

Figure 1A:
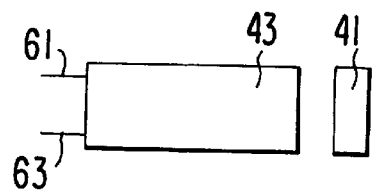
FIG. 1a is a block diagram of a position transmitter of the drive arrangement of FIG. 1.
Figure 2:
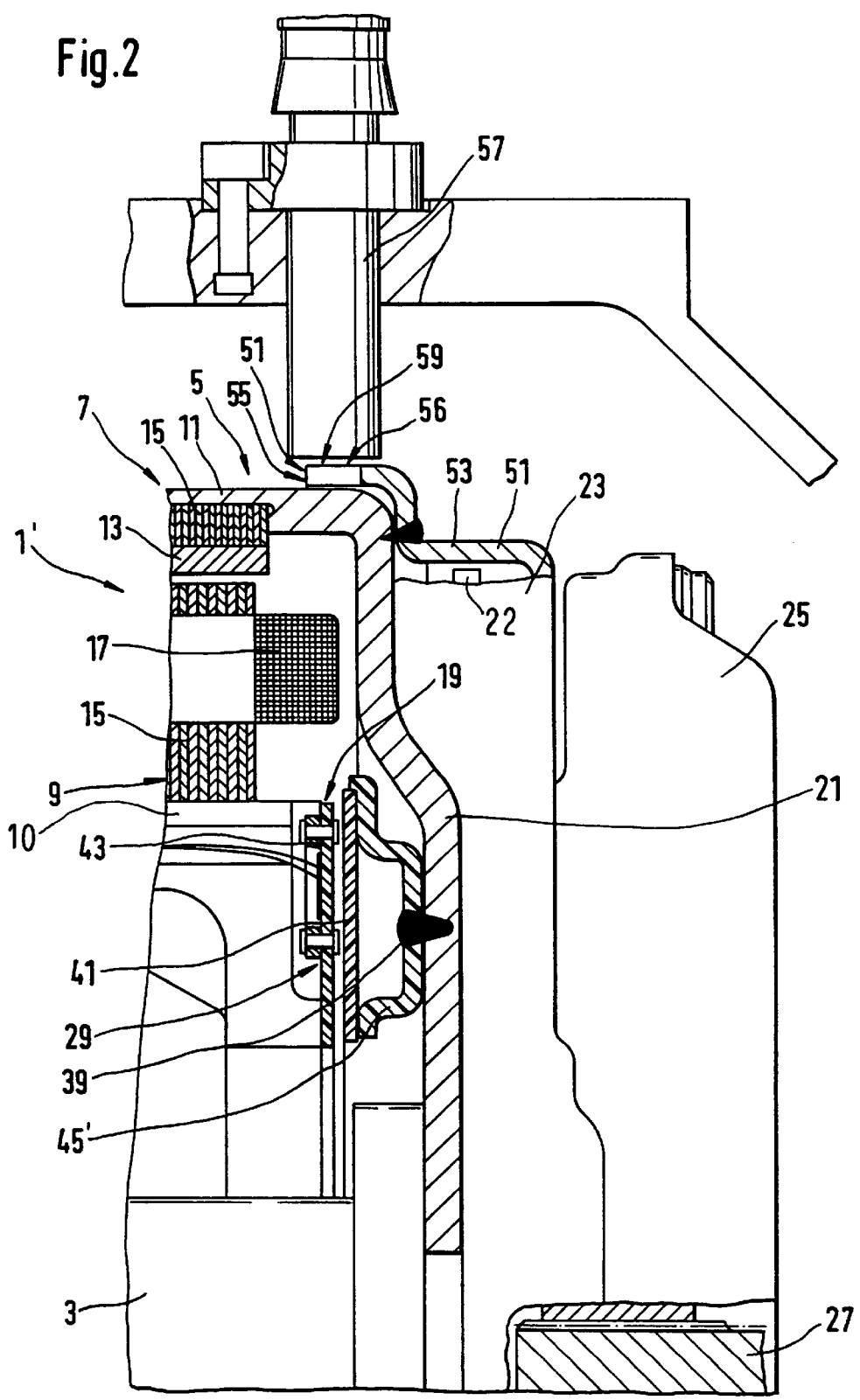
FIG. 2 shows a drive arrangement according to another embodiment of the invention with a welded-on holder to accommodate a resolver.
Figure 3:
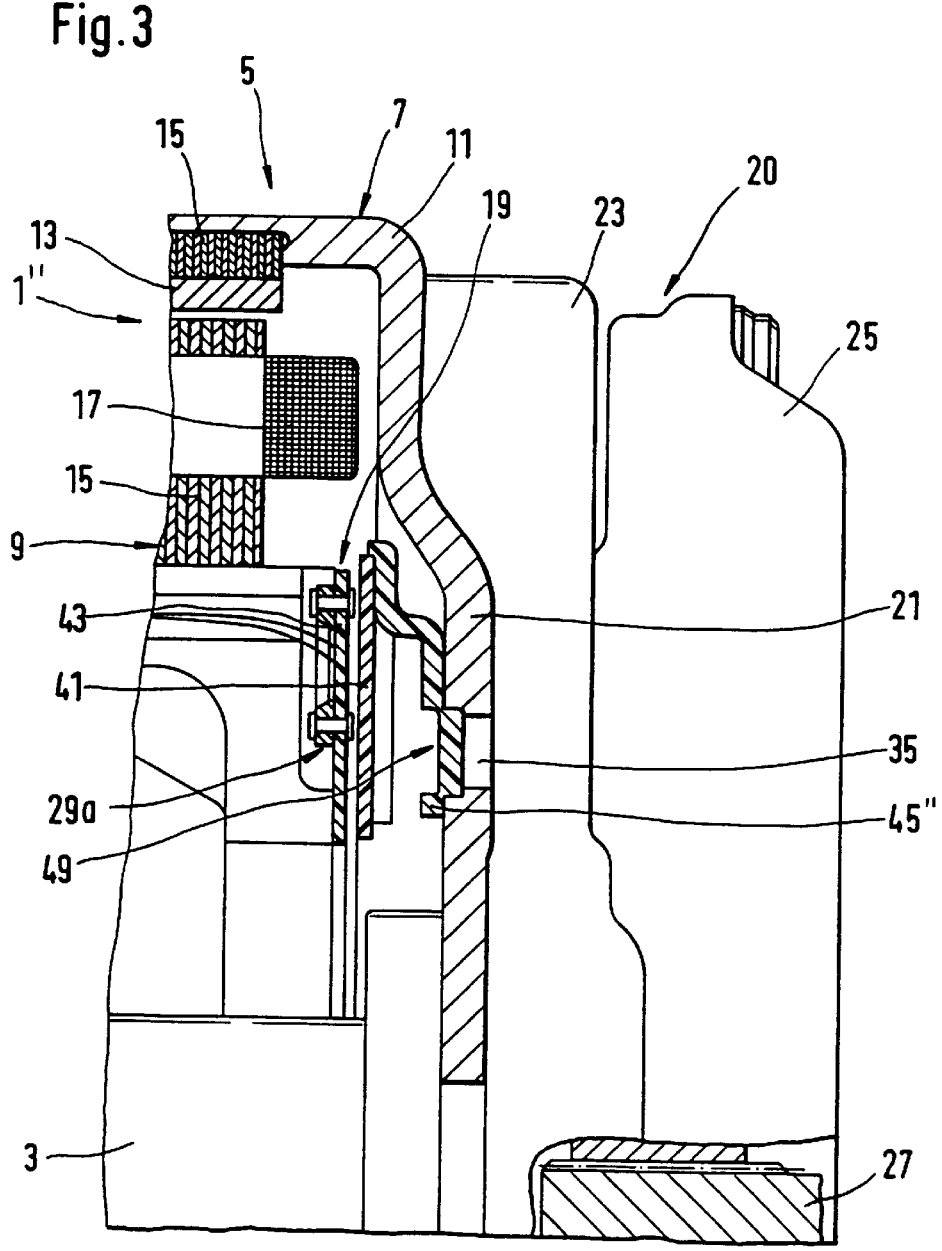
FIG. 3 shows a drive arrangement according to another embodiment of the invention having a holder connected to a rotor carrier via a press fit to accommodate the resolver.

The drive arrangement 1' illustrated in FIG. 2 differs from the drive arrangement 1 of FIG. 1 in that the moving element 41 of the position transmitter 19 which picks up the position of the rotor 7 is permanently connected to the rotor carrier 11 by a welded connection 39 of holder 45' to the primary flange 21 instead of the recess 35 and stud 47 connection of the embodiment of FIG. 1. The position transmitter 19 may comprise a resolver 29 as illustrated in the embodiments of FIGS. 1 and 2. To produce a permanent connection of a holder 45" to the primary flange 27 or rotor carrier 11, a press fit 49 may also be used, as shown in the embodiment of a drive arrangement 1" of FIG. 3. In addition, the position transmitter 19 may comprise a Hall sensor 29a instead of the resolver 29 as shown in FIG. 3. The Hall sensor 29a and resolver are interchangeable in any of the embodiments in FIGS. 1, 2 and 3.

Referring again to FIG. 2, a two-mass flywheel 23 is shown which has a cover plate 53 which is permanently connected to the primary flange 21 and has a circumferential bounding edge 54. Only a portion of the cover plate 53 is illustrated. This cover plate 53 forms an axial edge 51 of the two-mass flywheel 23. On a side of the bounding edge 54 facing the internal combustion engine, the cover plate 53 comprises a profile 55 which extends radially outside of primary flange 21. This profile 55 comprises circumferential projections 56.

A sensor system 57 is arranged radially outside of the profile 55 so that the sensor system 57 senses the presence of the projections 56 beneath the sensor system 57. The sensor system 57 may be used in conjunction with or in place of the position transmitter 19. Rotational movement of the crankshaft 3 is picked up by the sensor system 57 by sensing the movement of the projections 56. Spacings or axial recesses are provided between adjacent ones of the profiles 55. The sensor system 57 may also be arranged for detecting these spacings or axial recesses. To provide a significant point 59 on the circumference of the cover plate 53, it is preferable for one of the spacings between adjacent projections 56 of the profiles 55 to differ from the other spacings selected in the circumferential direction between the projections 56. To increase the dimensional stability of the profiles 55, the projections 56 may also be connected to one another at their ends, supporting one another in the circumferential direction.

The invention is not limited by the embodiments described above which are presented as examples only but can be modified in various ways within the scope of protection defined by the appended patent claims.

We claim:

1. A drive arrangement for a motor vehicle, comprising:

a crankshaft of an internal combustion engine;

a clutch system for selectively connecting said crankshaft to an output drive shaft, said clutch system having first and second flywheel masses, said first flywheel mass being rotatable relative to said second flywheel mass and having a primary flange fixedly connected to said crankshaft, said clutch system further comprising an electric machine activatable for producing a torque counter to rotational non-uniformities occurring in said crankshaft and having a stationary portion comprising a stator and a rotor mounted on a rotor carrier, said primary flange of said first flywheel mass comprising a portion of said rotor carrier; and a cover plate for said first and second flywheel masses fixedly connected to said primary flange and a sensor system for sensing movement of said cover plate, said cover plate comprising a profile forming an axial edge of said cover plate and arranged such that a movement of said profile is detectable by said sensor system.

2. The drive arrangement of claim 1, wherein said profile comprises a significant point on a circumference of said cover plate for identifying a predetermined crankshaft position.

3. A drive arrangement for a motor vehicle, comprising:

a crankshaft of an internal combustion engine;

a clutch system for selectively connecting said crankshaft to an output drive shaft, said clutch system having first and second flywheel masses, said first flywheel mass being rotatable relative to said second flywheel mass and having a primary flange fixedly connected to said crankshaft, said clutch system further comprising an electric machine activatable for producing a torque counter to rotational non-uniformities occurring in said crankshaft and having a stationary portion comprising a stator and a rotor mounted on a rotor carrier, said primary flange of said first flywheel mass comprising a portion of said rotor carrier; and a cover plate for said first and second flywheel masses fixedly connected to said primary flange and a sensor system for sensing movement of said cover plate, said cover plate comprising axial recesses arranged such that said sensor system detects movement of said axial recesses during rotational movement of said cover plate.

* * * * *